United States Patent
Novak et al.

(10) Patent No.: US 6,360,305 B1
(45) Date of Patent: Mar. 19, 2002

(54) METHOD AND APPARATUS FOR OPTIMIZING MEMORY PERFORMANCE WITH OPPORTUNISTIC PRE-CHARGING

(75) Inventors: Stephen T. Novak, Sunnyvale; John C. Peck, Jr., San Francisco, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/205,456

(22) Filed: Dec. 4, 1998

(51) Int. Cl.$^7$ .............................................. G06F 13/36
(52) U.S. Cl. ........................... 711/157; 711/5; 711/105; 711/111; 365/203; 365/230.03; 365/230.08
(58) Field of Search .............................. 711/5, 105, 111; 365/203, 230.03, 230.08

(56) References Cited

U.S. PATENT DOCUMENTS

| | | | | |
|---|---|---|---|---|
| 5,812,842 A | * | 9/1998 | Williams et al. | 395/653 |
| 5,825,710 A | * | 10/1998 | Jeng et al. | 365/230.03 |
| 5,896,551 A | * | 4/1999 | Williams et al. | 395/855 |
| 5,905,909 A | * | 5/1999 | Williams et al. | 395/834 |
| 5,936,903 A | * | 8/1999 | Jeng et al. | 365/203 |
| 5,953,280 A | * | 9/1999 | Matsui | 365/230.03 |
| 5,995,438 A | * | 11/1999 | Jeng et al. | 365/230.03 |
| 6,052,134 A | * | 4/2000 | Foster | 345/521 |

OTHER PUBLICATIONS

Micron Technology, Inc., Synchronous DRAM Data Sheet, 16Mb:×16 SDRAM.
Micron Technology, Inc., Synchronous DRAM Data Sheet, 64Mb:×4,×8,×16 SDRAM.
Micron Technology, Inc., Synchronous DRAM Data Sheet, 64Mb:×32 SDRAM.
Micron Technology, Inc., Synchronous DRAM Data Sheet, 128 MEG:×4,×8,×16 SDRAM.
Micron Technology, Inc., Synchronous DRAM Data Sheet, 256Mb:×4,×8,×16 SDRAM.

* cited by examiner

Primary Examiner—Reba I. Elmore
(74) Attorney, Agent, or Firm—Eshweiler & Associates, LLC

(57) ABSTRACT

A memory controller for a dynamic random access memory which pre-charges active banks in a particular chip select when an eight quadword access is made to another bank within that same chip select. When the memory controller detects an eight quadword access which is a page hit or page miss within the same chip select, the memory controller will look for any other active banks on that chip select. If there is another active bank other than the bank being accessed by the eight quadword access, the memory controller will attempt to transmit a pre-charge operation to that bank in the clock cycle immediately following the acceptance of the eight quadword access.

8 Claims, 2 Drawing Sheets

METHOD AND APPARATUS FOR OPTIMIZING MEMORY PERFORMANCE WITH OPPORTUNISTIC PRE-CHARGING

CROSS-REFERENCES TO RELATED APPLICATIONS

The following commonly assigned patent/patent applications are hereby incorporated herein by reference:

| Appl. No./Patent No. | Filing Date | Attorney Docket No. |
|---|---|---|
| 09/205,665 | 12/4/1998 | D748 | entitled: "Queue Based Memory Controller".

FIELD OF THE INVENTION

This invention relates to computer systems and more particularly to memory control mechanisms and techniques employed within computer systems. This invention also relates to performance enhancement and optimization of memory control mechanisms for computer systems.

BACKGROUND OF THE INVENTION

A variety of techniques have been developed to increase the overall processing speed of computer systems. While improvements in integrated circuit processing technologies such as sub-micron processing capabilities have made it possible to dramatically increase the speed of the integrated circuitry itself, other developments in the architectures and bus transfer mechanisms of computer systems have also led to improvements in performance. Exemplary developments include the incorporation of cache memory subsystems as well as code pre-fetching mechanisms within computer systems.

Typically, accesses to main memory are a performance bottleneck in today's computer systems. For example, when using dynamic random access memory (DRAM) or synchronous DRAM (SDRAM), the need to pre-charge before a memory access can degrade performance.

Main memory is usually divided up into chip select's (CS) which are further divided into banks and an array of rows and columns. A particular CS, bank and row is called a page. In order to access data within the memory, first the bank must be pre-charged, then the row must be activated. Once activated, the row of data is moved from the memory array into a row buffer (for which there is one per bank) on the memory chip from which access to the data occurs. If a row is already active, a subsequent request to data within that row can access the data from the row buffer. This scenario is called a page hit (PH). A PH has the lowest latency (highest performance) because there is no need to pre-charge or activate. A subsequent request to a different, inactive row within a bank that already has an active row from a prior request in the row buffer is called a page conflict (PC). A PC is the highest latency scenario because it requires that the bank be pre-charged and then activated again. Further, the prior request which activated the row currently within the row buffer may not be completed yet. This will cause the subsequent PC request to be stalled because the bank cannot be pre-charged until the prior request completes.

The combination of these request scenarios, the random nature of memory requests, the ability to retain a page within a row buffer and the time delays involved in accessing the memory give rise to techniques for maintaining the most efficient use of the memory. These techniques are referred to as 'page policies.' A page is defined as being "open" if it has been activated into the row buffer and any data written to the page has not been updated back into the memory array. A pre-charge operation to a bank will close any page that is currently open in the row buffer and write it back to the memory array. A CS is defined as "open" if there are open pages in any of its row buffers. A CS is "closed" once all open pages are "closed" by being written back to the memory array.

A first policy is called an "open" page policy. In an open page policy, once a page is activated and moved into the row buffer for a current request, it is left there after the request completes. The page is only "closed" when another request is directed to a different, inactive row within the same CS and bank (a PC). This policy is effective and efficient if the majority of the requests to the memory are expected to be PH's since PH requests take the least time to complete. These requests would only have to perform the read or write operation to the row buffer. A problem with this policy occurs, however, if the majority of the memory requests turn out to be PC's. The PC scenario takes the longest time to complete, especially if the prior request has not finished yet, and therefore there is a risk of a significant performance loss.

A second policy is the "Closed Page" policy. Under this policy, only one CS is allowed to be open (have open pages) at any given time. In effect, when a request is received for a different CS, the currently open CS is closed. Part of the process of closing the CS is to send a pre-charge command to that CS. This will force any active pages in the row buffers to be closed. Closing the open CS with a pre-charge command leaves that CS in a pre-charged state for any subsequent requests. Under this policy, there will be fewer PH scenarios occurring and some PH opportunities will be lost (PH's will only occur for requests to any active pages within the one open CS) but the tradeoff is less risk of having PC's occur.

While implementing a closed page policy will greatly reduce the PC's, it will not eliminate them. Multiple requests to different rows of the same bank within any one CS will still cause PC's to occur even under a closed page policy.

Accordingly there is a need to optimize and enhance the performance of memory accesses to the memory by reducing the occurrence of page conflicts when there are multiple requests to different rows within the same bank of a particular CS and reducing the latency/penalty following page conflicts when they do occur.

SUMMARY OF THE INVENTION

The problems outlined above are solved by an apparatus and method for optimizing memory requests to a computer memory according to the present invention. In one aspect of the invention, there is provided a memory controller for controlling requests to a computer memory wherein the computer memory is divided into at least one chip select coupled to the memory controller, where the chip select is further divided into banks and further wherein the memory requests include a first request directed to a first one of the banks. This apparatus includes a request dispatcher coupled to the memory controller which is operative to transmit the first request to the memory controller and a request acceptance indicator coupled to the memory controller which is operative to indicate that the first request has been accepted. Further, the apparatus includes a request size calculator coupled to the request dispatcher which is operative to indicate that the first request is an eight quadword access, a table which stores a plurality of data entries representing currently active banks and corresponding active rows and a bank comparator coupled to the request dispatcher and the table which determines that the first request is a page hit or page miss. The apparatus also includes an active bank selector coupled to the table which is operative to select a second bank from the plurality of data entries and a pre-charge generator responsive to the request acceptance indicator, the request size calculator, the first and second bank comparators and the active bank selector. The pre-charge generator generates a pre-charge operation to the second bank one clock cycle after the first request has been accepted by the main memory when the second bank is active and is different from the first bank and when the first request is an eight quadword request and a page hit or page miss.

The present invention further contemplates a method for optimizing memory requests to a computer memory wherein the computer memory is divided into at least one chip select coupled to a memory controller, the chip select being further divided into banks and further wherein there is a first memory request directed to a first one of the banks, the method comprises the steps of: sending the first request to the memory controller and determining that the memory controller has accepted it; determining that the first request is an eight quadword page hit or page miss; determining that there is a second bank active; generating a pre-charge operation to the second bank one clock cycle after the first request has been accepted by the main memory when the second bank is active and when said second bank is a different bank then the first bank and when said first request is an eight quadword request and a page hit or page miss.

As a result of this invention, memory accesses to the SDRAM main memory are optimized and the memory performance is increased by reducing the occurrence of page conflicts when there are multiple requests to different rows within the same bank of a particular chip select and reducing the latency/penalty following page conflicts when they do occur.

DETAILED DESCRIPTION OF THE PRESENTLY PREFERRED EMBODIMENTS

Figure 1:
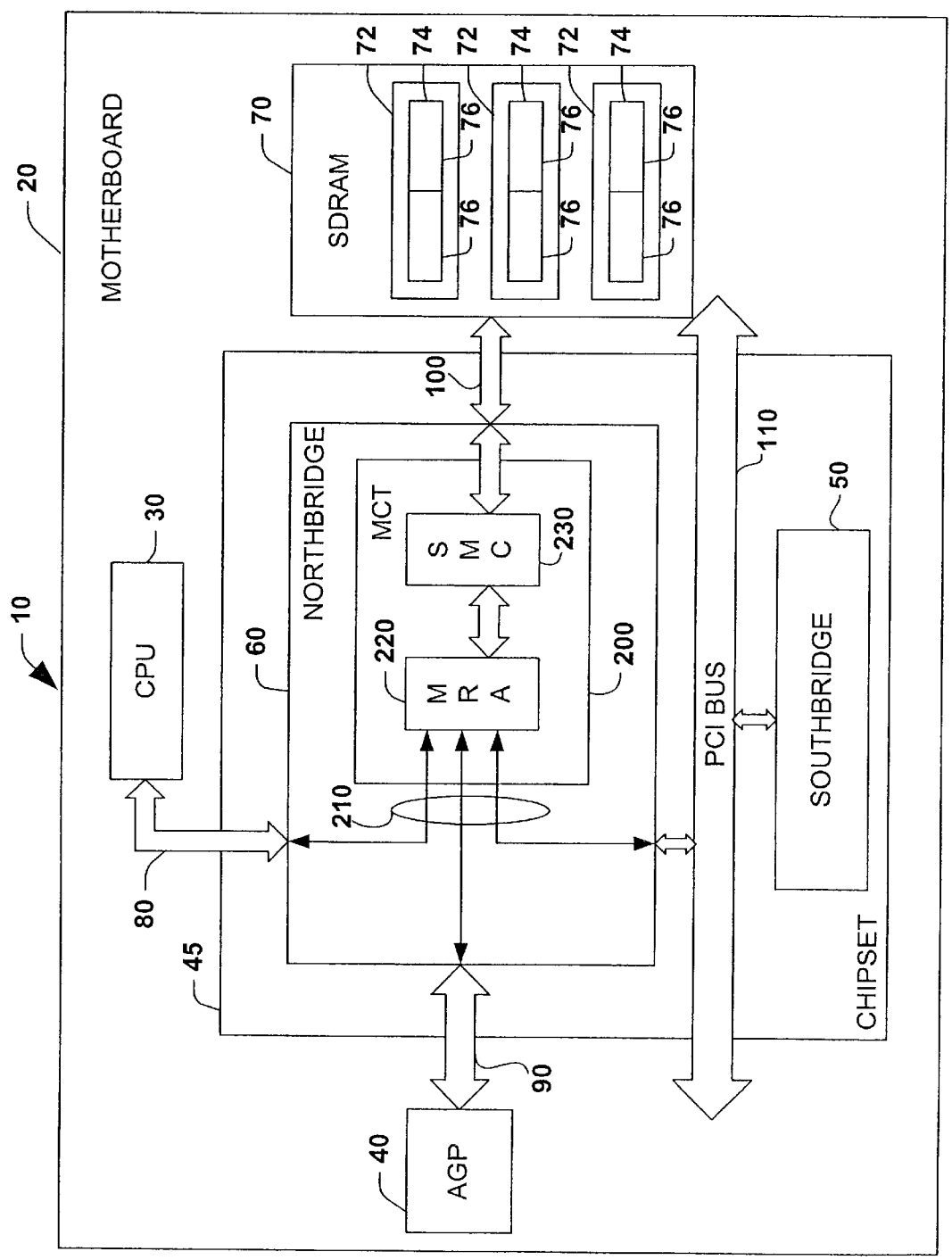
FIG. 1 is a block diagram of an exemplary computer system for use with the memory controller according to the preferred embodiment.

Turning now to the drawings, FIG. 1 shows selected components of an exemplary computer system 10 including a motherboard 20, a central processing unit (CPU) 30, an Advanced Graphics Port (AGP) 40, a chip set 45, a memory 70, a CPU bus 80, an AGP bus 90, a memory bus 100 and a PCI bus 110. It will be appreciated that CPU's 30, busses 90, 100, 110 and motherboards 20 are well known in the art. Further, it will be appreciated that the AGP 40 is but one example of a typical input/output (I/O) device included in the computer system 10, and that the computer system 10 can include a variety of I/O devices which are well known in the art.

The chip set 45 interconnects all of the components of the computer system 10 listed above to each other. In the preferred embodiment, the chip set 45 includes two chips known in the industry as the "Northbridge" 60 and "Southbridge" 50. Alternatively, the chip set 45 can include other chips and the Northbridge 60 and Southbridge 50 can, themselves, include more than one chip. An exemplary Northbridge 60 is the Irongate Northbridge chip manufactured by AMD, Inc. in Sunnyvale, Calif. The exemplary Northbridge 60 is designed to work with a motherboard 20 system bus clock speed of 100 MHZ, however higher clock rates can be used. The Northbridge 60 is designed to interconnect the memory 70 with the other devices in the computer system 10 that need to access the memory 70. Typically, these devices include the CPU 30 and newer technology I/O devices, such as the AGP 40 or I/O devices connected to the PCI bus 110, including the Southbridge 50. These devices are also known as memory requesters 210 and they make memory requests to the Northbridge 60 which then executes and completes these requests to the memory 70 (discussed in more detail below). The Southbridge 50 is usually designed to provide legacy compatibility with older technology I/O and interfaces these devices to the PCI bus 110. The exemplary Northbridge 60 is designed to connect to the CPU 30 using the CPU bus 80, to the AGP 40 using a dedicated AGP bus 90, to the memory 70 using a dedicated memory bus 100 and to all other devices using the PCI bus 110. It will be appreciated that the Northbridge can use other bus topologies to interconnect the various components on the motherboard 20.

The Northbridge chip includes a memory controller (MCT) 200 which controls and directs the flow of data between the memory requestors 210 and the memory 70 over the memory bus 100. The MCT 200 includes a memory request arbiter (MRA) 220 and an SDRAM memory controller (SMC) 230. The MCT 200 handles generation, prioritization and management of operations with the memory 70 (as explained below).

The memory 70 preferably includes several sockets 72 mounted on the motherboard 20 for receiving Dual Inline Memory Modules (DIMM's) 74. In the preferred embodiment, the motherboard 20 includes three sockets 72, each capable of holding one DIMM 74. Alternatively, single inline memory modules or other form of memory carrier can be used. The sockets 72 provide the connections between the DIMM's 74 and the memory bus 100. The memory bus 100 interconnects the memory 70 with the Northbridge 60. Each DIMM 74 includes a printed circuit board with one or more memory chips soldered to each side. In the preferred embodiment, these memory chips include synchronous dynamic random access memory (SDRAM) chips however, other types of DRAM memory chips can be used. Each side of the DIMM 74 is hereinafter referred to as a CS 76.

SDRAM chips are well known in the art as a derivative form of the DRAM type memory. SDRAM chips can run at higher clock speeds than conventional DRAM by synchronizing their operations to the rest of the computer system 10., Further, SDRAM chips also provide burst access mode which gives the additional advantage of higher access times to the memory 70. In burst access mode, the Northbridge 60 is able to retrieve more data from the memory 70 with each access. This cuts down the number of requests that need to be sent to the memory 70 which saves bandwidth on the memory bus 100. SDRAM chips contain a mode register which can be initialized to the desired burst data size. Once the ode register is set, each access to the memory 70 will cause the SDRAM chips to dump the set amount of data. For example, in the preferred embodiment the memory bus 100 is 64 bits wide. If the burst data size is et to 8 quad words (QW) or 64 bytes, the Northbridge 60 can dispatch the address of the first QW and then over the period of the next 8 clock cycles, the memory 70 will send 1 QW per cycle over the memory buss 100 to fulfill the request without further requests from the Northbridge 60.

SDRAM chips come in different types based on the bit density of the chips. Examples are 64 M×4 b or 32 M×8 b manufactured by Micron Technology, Inc. The combination of the SDRAM density, the number of SDRAM chips soldered each DIMM 74 and the number of DIMM's 74 plugged into the available sockets 72 on the mother board 20 yields the total size of the main memory in the computer system.

Physically, the main memory of the computer system is typically divided by each CS. Each CS 76 is connected to a Chip Select (CS) signal on the memory bus 100 which is used by the Northbridge 60 to activate only those memory chips. There is a unique CS signal for each CS 76 allowing the Northbridge 60 to address each CS 76 independently. When a CS 76 is accessed, all memory chips that are a part of that CS 76 are accessed simultaneously as though they were a single unit. This allows for interleaved accesses where if one CS 76 is busy servicing a request, the Northbridge 60 can send another request to another CS 76 without waiting for the first request to complete.

To further promote higher memory bandwidth, each CS 76 is typically divided into separate banks which can be independently accessed. This allows for interleaved memory accesses within a particular CS 76. The number of banks is dependent upon the manufacturer of the memory chips used in the DIMM 74. The physical layout of the memory storage circuits in each bank of each memory chip is usually in an array arrangement (row/column) and the SDRAM provides inputs for a row address and a column address to access into this array. Therefore, to access any location in the memory 70, the computer system 10 need only choose a particular CS 76, bank, row address and column address. In the preferred embodiment, each DIMM 74 has 2 CS 76 with each CS 76 having up to 4 banks, up to 8,192 (8 K) Rows and up to 2048 (2 K) Columns. The combination of specifying a particular CS 76, bank and row is also referred to herein as a page.

In addition, SDRAM memory chips provide buffer storage called an SDRAM row buffer (row buffer). There is usually one row buffer per bank. Once a page has been selected (also known as an Activate operation, discussed in more detail below), the SDRAM will move the selected row into the bank's row buffer. From the row buffer, the column address is used to select the desired data for read or write operations. Because moving a row into the row buffer destroys the contents of the row in the memory array, the memory control logic must be sure to cause the row buffer contents to be stored back in the memory array before moving a different row into the row buffer. Operation and use of the row buffers is described in more detail below.

A typical memory request takes places as follows. For example, the CPU 30 determines that it needs to read or write some data. The CPU 30 will dispatch a request along with an address to the Northbridge 60 to retrieve the desired data. The MCT 200 will convert the address into a physical memory location consisting of a CS 76, bank, row and column. The MCT 200 must then determine if the particular CS 76 and/or bank are busy due to a timing dependency such as where another request is currently transferring data from the same bank. If the particular CS 76 and/or bank are busy, the MCT 200 must wait for them to become available before sending an operation.

In order to access a particular row in the SDRAM, if this row is not already active (see below), the bank containing that row must be pre-charged. Effectively, pre-charging raises all of the bit lines (the wires that connect the rows in each bank to the SDRAM buffer) to a voltage that represents a logical 1. When the page is activated (or connected to the bit lines), any bits in the page containing logical zeroes cause the respective bit lines to drop to logical zero. This saves time versus initializing the bit lines to logical zero and waiting for the bits in the page representing a logical 1 to charge up the respective bit lines. A pre-charge operation also causes any currently active row, from a previous access to the bank, to be written back to the memory array from the row buffer so that the data is not lost (see below). An entire CS 76 or an individual bank can be pre-charged in several ways. Pre-charging occurs upon initialization of the memory, whenever there is a refresh to that CS 76 or whenever the MCT 200 dispatches a pre-charge operation to that CS 76 or bank. If the bank is not currently pre-charged, the MCT 200 will issue a pre-charge operation to the desired CS 76 in order to pre-charge the bit lines of the desired bank (or possibly all the banks) on that CS 76.

Next, an activate operation is sent to the desired CS 76 and bank along with the row address in order to activate the particular page onto the bit lines and transfer the page of data into the bank's row buffer. Note that, due to the nature of DRAM memory, an activate operation destroys the contents of that row in the memory array in the process of moving those contents to the row buffer. In order to replace the contents back in the memory array and ensure that they are not lost, a pre-charge operation (as discussed earlier) is necessary before activating another row into the row buffer. Once the page is in the row buffer, the appropriate read or write operation can be dispatched along with the column address identifying the bits to read or write. The data is then transferred to or from the Northbridge 60 and the memory 70 and ultimately passed back to the CPU 30. Note that once a row is activated and in the row buffer, the MCT 200 can perform many reads and writes to that row without performing an additional pre-charge or activate operation. Co-pending and commonly assigned applications entitled "QUEUE BASED MEMORY CONTROLLER", Ser. No. 09/205,665, filed on Dec. 4, 1998 and "METHOD AND APPARATUS FOR OPTIMIZING MEMORY PERFORMANCE WITH OPPORTUNISTIC REFRESHING", Ser. No. 09/205,978, filed on Dec. 4, 1998, herein incorporated by reference, further describe operation of the MCT 200 for completing memory operations.

For the exemplary Northbridge 60, memory requests to the memory 70 can be classified into three scenarios. These scenarios are also used to identify the primitive operations (pre-charge, activate and read/write) that the MCT 200 must send to the memory 70 in order to complete the request. The first scenario is called a page hit (PH) when the memory request is directed to a page that is already active in the row buffer of a particular CS 76 and bank. This type of transaction has the lowest latency because only the read/write operation and the appropriate column address need to be dispatched. The only delay incurred is the turn around time of the memory 70 to send the appropriate data back or write the data to the row buffer.

The second scenario is called a page conflict (PC). A PC occurs when the memory request is to a CS 76 and bank that currently has an active page in its row buffer but this request is directed to a different row. This scenario involves the longest latency due the fact that the bank must be pre-charged and then the new page must be activated into the row buffer before the read/write operation can be dispatched. In addition, further delay is introduced if the operation that put the current page in the row buffer has not yet completed.

Then the request for the new page must be stalled. Where a PC occurs, the MCT 200 will need to dispatch a pre-charge, activate and read/write operation to the SDRAM.

The third scenario is called a page miss (PM). A PM occurs when the current request is to a bank that has no currently active page in its SDRAM buffer. PM's are of two types. The first is a PMc, where the current request is to a CS 76 that is not the CS 76 most recently used. The second is a PMb, where the current request is to the most recently used CS 76 but to a different bank. In a PM, the memory control logic need only dispatch an activate operation to move the desired page into the row buffer followed by a read/write operation. For a PMc, a pre-charge operation is also sent to the most recently used CS 76 to implement a closed page policy. Note that by definition of the closed page policy, a PM is guaranteed to be to a bank that is already pre-charged. If the bank were not already pre-charged, it would mean that there was an active row already in the row buffer, making this a PC scenario.

Figure 2:
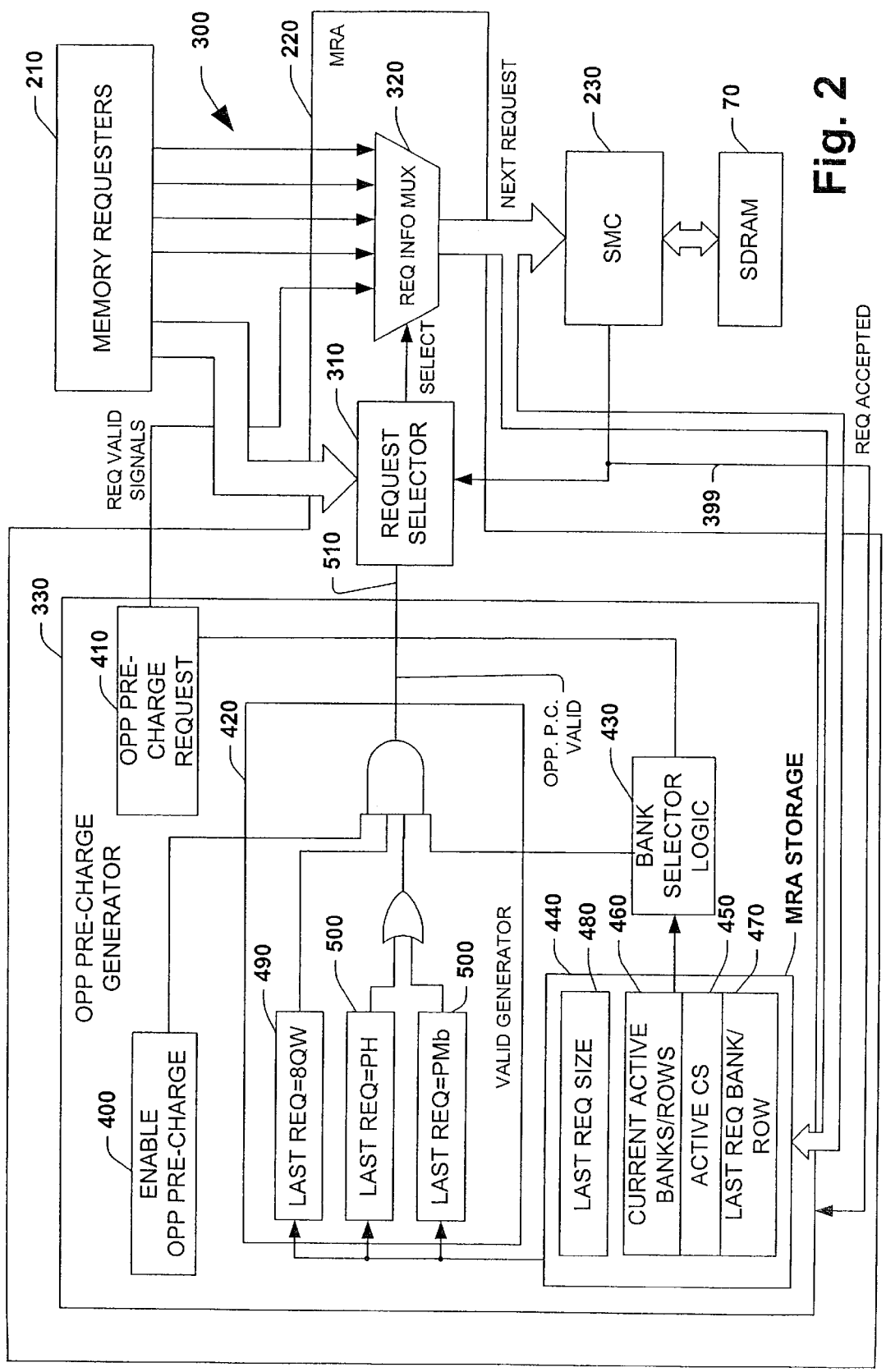
FIG. 2 is a block diagram depicting the memory controller of FIG. 1.

Referring now to FIG. 2, there is shown a more detailed view of the MRA 220. The MRA 220 includes inputs 300 for the memory requesters 210, priority selection logic 310, a request information multiplexor (req. info. mux) 320 and an opportunistic pre-charge generator 330.

The memory requestors 210 make various requests on the inputs 300 of the MRA 220 for access to the memory 70. Requests are passed to the priority selection logic 310 and the req. info. mux 320 which together decide which request will be sent to the memory 70 and then send that request to the SMC 230. If the SMC 230 sees a valid request from the MRA 220 and is able to handle the request, it will accept the request and assert the request accepted signal 399. Once the request is accepted, the SMC 230 will handle completing that request to the memory 70.

The opportunistic pre-charge generator 330 is also connected as a requestor to the priority selection logic 310 and the req. info. mux 320. The opportunistic pre-charge generator 330 includes an opportunistic pre-charge enabling register 400, a pre-charge request generator 410, a pre-charge valid signal generator 420, bank selector logic 430 and MRA storage 440. The MRA storage 440 stores information about previous requests that have been accepted by the SMC 230. The MRA storage 440 stores information regarding the currently open pages in the system. It stores data representing the currently active CS 450, the currently active banks and corresponding rows 460 in the currently active CS, the bank and row accessed 470 by the last request accepted by the SMC 230 and the data size 480 of the last request accepted by the SMC 230. The currently active bank data 460 stores active bits for each bank in the CS and is updated whenever a request is sent to the memory 70. When a bit is set for a particular bank, it means that the bank has an active row in its row buffer. Clearing this bit closes the active page of that bank. A PH performs no update because it is not necessary to close any of the currently active pages. A PMb sets the active bit corresponding to the bank with the newly activated row. A PMc sets an active bit corresponding to the bank with the newly activated row, clears the other active bits to close those pages and sets the currently active CS 450 to represent the newly active CS. A pre-charge clears the corresponding active bank bit to close the page.

The bank selector logic 430 is connected to the MRA storage 440 and selects an appropriate bank of the currently active banks 460 to be opportunistically pre-charged. A bank is appropriate for an opportunistic pre-charge if it is not the same bank 470 as used by the last request sent to the SMC 230. The last request sent to the SMC 230 represents the request that is currently being worked on by the memory and it is preferable not to pre-charge and therefore close that bank before the request completes. When the bank selector logic 430 selects an appropriate bank, it asserts a signal to the pre-charge valid signal generator 420 and sends the CS and bank information to the pre-charge request generator 410.

The pre-charge valid signal generator 420 is connected to the MRA storage 440, the bank selector logic 430 and the opportunistic pre-charge enabling register 400. The pre-charge valid signal generator 420 also provides an input for the request accepted signal 399 from the SMC 230. The request accepted signal 400 is asserted for one cycle following the acceptance of a request by the SMC 230. The pre-charge valid signal generator 420 further includes logic 490 to determine whether or not the last request was eight quadwords in length and logic 500 to determine whether the last request as a PH or a PMb. The pre-charge valid signal generator 420 asserts an opportunistic pre-charge valid signal 510 to the priority selection logic 310 when the opportunistic pre-charge enabling register 400 is set to enable opportunistic pre-charge, the last request accepted by the SMC 230 was a PH or a PMb and 3 was eight quadwords in length, the bank selector logic 430 has selected an appropriate bank for pre-charge and the request accepted signal 400 is asserted (indicating that this is the vary next cycle following acceptance of the last request.

The pre-charge request generator 410 is connected to the bank selector logic 430 and the req. info. mux 320. The pre-charge request generator 410 generates the pre-charge memory request with the selected CS and bank information from the bank selector logic 430 and sends it to the req. info. mux 320 to be sent to the SMC 230. The priority selection logic is preferably designed to give the highest priority to opportunistic pre-charges because of the restricted timing requirement that an opportunistic pre-charge can only be issued on the very next cycle following an eight quadword PH or PMb memory request. When the pre-charge valid signal generator 420 asserts the opportunistic pre-charge valid signal 510, the priority selection logic 310 controls the req. info. mux to select the request from the pre-charge request generator 410 to send that request to the SMC 230.

In this way, active banks other than one currently being accessed (by the last request accepted by the SMC 230) are pre-charged and made ready for future accesses. This reduces the chance that a PC situation will occur where a request to an inactive row in an active bank is made. Effectively, by pre-charging the bank ahead of time, a PC situation has been turned into a PM situation. However, it could also be said that a PC still occurs but that the required pre-charge is sent early to minimize the latency. By sending out the opportunistic pre-charge behind an eight quadword access, any performance penalty is minimized. Should there be a subsequent access to the bank undergoing pre-charge, the time required to perform the eight quadword data transfer to the other bank allows enough time to complete the pre-charge request and perform an activate on the bank to get it ready for the read/write operation. The read/write operation has to wait anyway until the current data transfer completes because only one bank can transfer data on the bus at a time. This promotes maximum performance through optimal bus utilization.

It is intended that the foregoing detailed description be regarded as illustrative rather than limiting and that it is understood that the following claims including all equivalents are intended to define the scope of the invention.

We claim:

1. A method for optimizing memory requests to a computer memory wherein said computer memory comprises a memory controller and at least one chip select coupled to said memory controller, said chip select comprising first and second banks and further wherein said memory requests comprise a first request, where said first request is directed to said first bank, said method comprising the steps of:

sending said first request to said memory controller;

determining that said first request has been accepted by said memory controller;

determining that said first request is an eight quadword access; determining that said first request is a page hit;

determining that said first request is a page miss;

determining that said second bank is active;

generating a pre-charge operation to said second bank one clock cycle after said first request has been accepted by said main memory when said second bank is active and when said second bank is different from said first bank and when said first request is an eight quadword request and a page hit; and generating a pre-charge operation to said second bank one clock cycle after said first request has been accepted by said main memory when said second bank is active and when said second bank is different from said first bank and when said first request is an eight quadword request and a page miss.

2. The method of claim 1 wherein said chip select comprises a plurality of banks and further wherein, more than one bank of said plurality of banks are active, said step of determining that said second bank is active further comprises the step of selecting one of said more than one active banks for pre-charging.

3. The method of claim 2 wherein said selecting step is a chip select ordered selection.

4. The method of claim 2 where in said selecting step is a prioritized selection.

5. An apparatus for optimizing memory requests to a computer memory wherein said computer memory comprises a memory controller and at least one chip select coupled to said memory controller, said chip select comprising first and second banks and further wherein said memory requests comprise a first request, where said first request is directed to said first bank, said apparatus comprising:

a request dispatcher coupled to said memory controller and operative to transmit said first request to said memory controller;

a request acceptance indicator coupled to said memory controller and operative to indicate that said first request has been accepted by said memory controller;

a request size calculator coupled to said request dispatcher operative to indicate that said first request is an eight quadword access;

a table which stores a plurality of data entries representing currently active banks and corresponding active rows;

a first bank comparator coupled to said request dispatcher and said table which determines that said first request is a page hit;

a second bank comparator coupled to said request dispatcher and said table which determines that said first request is a page miss;

an active bank selector coupled to said table and operative to select said second bank from said plurality of data entries; and a pre-charge generator responsive to said request acceptance indicator, said request size calculator, said first and second bank comparators and said active bank selector.

6. The apparatus of claim 5 wherein said pre-charge generator generates a pre-charge operation to said second bank one clock cycle after said first request has been accepted by said main memory when said second bank is active and when said second bank is different from said first bank and when said first request is an eight quadword request and a page hit.

7. The apparatus of claim 5 wherein said pre-charge generator generates a pre-charge operation to said second bank one clock cycle after said first request has been accepted by said main memory when said second bank is active and when said second bank is different from said first bank and when said first request is an eight quadword request and a page miss.

8. An opportunistic pre-charge generator for a dynamic random access memory, wherein said memory comprises at least one chip select, said at least one chip select comprising first and second banks, said pre-charge generator comprising:

an enabling configuration register operative to assert a control signal to enable operation of said pre-charge generator;

a last request accepted indicator asserted when a previous request to said memory has been accepted;

a last request size indicator asserted when said previous request is 8 quadwords in size;

an active bank table operative to maintain a list of active banks and rows in an active chip select;

a bank indicator coupled to said active bank table and asserted when said previous request is a page hit, and further asserted when said previous request is a page miss to said active chip select;

a bank selector coupled to said active bank table and operative to select said second bank for pre-charge when said second bank is active and different from said first bank; and wherein said pre-charge generator generates a pre-charge request to said memory when said register, said accepted indicator, said size indicator and said bank indicator are asserted and said bank selector has selected a bank.

* * * * *